United States Patent

[11] 3,586,872

[72] Inventor Ping K. Tien
Chatham Township, Morris County, N.J.
[21] Appl. No. 817,678
[22] Filed Apr. 21, 1969
[45] Patented June 22, 1971
[73] Assignee Bell Telephone Laboratories, Inc.
Murray Hill, Berkeley Heights, N.J.,

[54] APPARATUS INCLUDING A THIN FILM WAVEGUIDE FOR NONLINEAR INTERACTION OF OPTICAL WAVES
4 Claims, 1 Drawing Fig.
[52] U.S. Cl. .................................... 307/88.3,
321/69, 330/4.5, 330/5, 330/53, 331/107, 333/95, 333/98, 350/96
[51] Int. Cl. ..................................... H03f 7/00

[50] Field of Search ......................... 307/88.3; 321/69; 330/4.5

Primary Examiner—Roy Lake
Assistant Examiner—Darwin R. Hostetter
Attorneys—R. J. Guenther and Arthur J. Torsiglieri ABSTRACT: Nonlinear interaction of optical waves is achieved in a thin film waveguide by exciting appropriate modes of the waves to be interacted whereby phase matching is achieved in the substrate between the evanescent fields of the waves. The desired modes are excited by use of internal-reflection prism coupling in the manner described in copending application Ser. No. 793,696 filed Jan. 24, 1969.

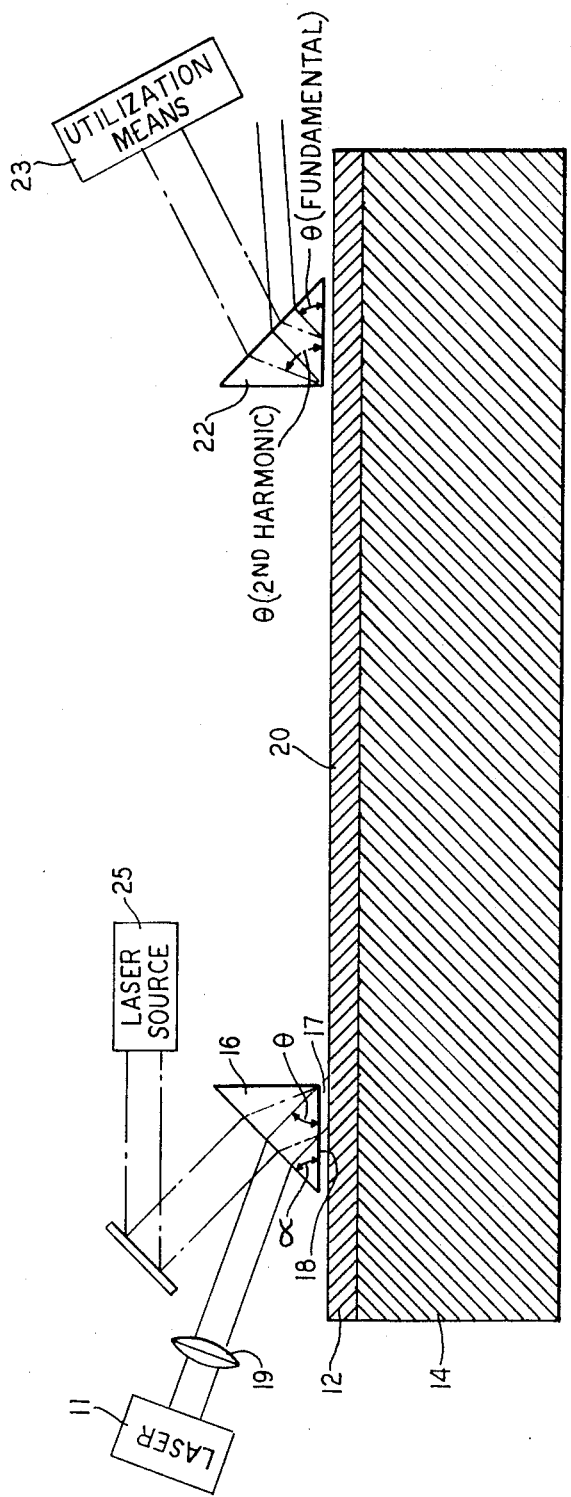

APPARATUS INCLUDING A THIN FILM WAVEGUIDE FOR NONLINEAR INTERACTION OF OPTICAL WAVES

BACKGROUND OF THE INVENTION

This invention relates to apparatus for carrying out nonlinear interaction processes in light. Typical of such noninteraction processes are parametric amplification, harmonic and subharmonic generation, and frequency shifting.

Various techniques for carrying out nonlinear interaction processes with optical waves are now known. In such processes it typically is important to achieve high intensities of optical wave energy in a localized area to realize high efficiencies. In my copending application Ser. No. 793,696, filed Jan. 24, 1969, assigned to the assignee hereof, there is described a technique for coupling light waves in and out of a thin film of a suitable material superposed on a suitable substrate of different refractive index whereby the film serves as a waveguide for the light waves. This technique makes it feasible to concentrate the wave energy of a light beam into a thin film and so to realize in the film intensities higher than in the beam. Such a thin film accordingly would be particularly useful as a medium to support nonlinear interaction processes.

However, another consideration that is important in achieving high efficiency in nonlinear interaction processes is that of phase matching. Specifically, if the interaction is to be efficient, it is important for the interaction to extend over at least several wavelengths of the optical energy and that the energy stimulated by the interaction be cumulative in effect. This generally requires that the phase velocity of the stimulated wave energy have a component equal to that of a component of the stimulating wave energy. In typical prior art nonlinear devices, this is achieved by matching the phase velocity of the extraordinary ray of one of the two interacting waves with the phase velocity of the ordinary ray of the other wave. However this imposes the requirement for use of this technique that the medium where the interaction is to occur be birefringent.

However, in many instances it will be desirable to use in the waveguiding film in the arrangement described above, materials, such as zinc oxide and zinc sulfide, which exhibit little birefringence and so phase matching in the manner described is not practical.

The present invention is directed to a technique for utilizing nonlinear interaction which avoids the need for birefringence in the waveguiding film.

SUMMARY OF THE INVENTION

In accordance with the present invention, the desired interaction is achieved in the substrate and occurs between the evanescent fields of waves propagating in the waveguiding film, and phase matching is achieved by utilizing different propagating modes in the film for the stimulated and stimulating waves whereby the desired relationships in propagation characteristics are satisfied.

As has been pointed out in my earlier above-identified application, a thin film waveguiding structure is characterized by a plurality of possible propagating modes and control of the mode propagation is feasible by appropriate adjustment of the angle of incidence of the optical wave being introduced at the coupling region.

BRIEF DESCRIPTION OF THE DRAWING

A more complete understanding of the invention will be obtained from the following detailed description taken together with the drawing which is a partially pictorial and partially block diagrammatic illustration (not to scale) of an embodiment of the invention useful to generate harmonics or subharmonics of input optical wave energy; and by the provision for the introduction of a pair of optical waves into the waveguiding film which defines the interaction region can serve as a parametric amplifier or frequency mixer.

DESCRIPTION OF ILLUSTRATIVE EMBODIMENTS

In the illustrative embodiment shown, coherent light from a laser 11 is introduced for propagation therealong into a thin film waveguide 12, which has a thickness suitable for serving this function, typically several times the wavelength in free space of the output of laser 11, and a width of several millimeters. The film 12 is supported on a substrate 14 which has an index of refraction sufficiently less than that of film 12 that waveguiding action is achieved as now known to workers in the art. Preferably, there is a difference of at least 5 percent, although smaller differences can be usefully employed.

To facilitate the introduction of wave energy from laser 11 into film 12 an internal reflection prism 16 is disposed intermediate between the laser and the film 12, separated from the latter by a gap 17. The gap 17 is sufficiently small that the evanescent field of a light wave incident upon the internal reflection surface 18 of the prism extends across the gap 17 into the thin film 12. The evanescent field is that field which tunnels through the internally reflective surface 18 and extends into the gap 17. It is a consequence of the wave nature of a photon. This field tends to fall off exponentially with distance from surface 18. For this reason, the width of the gap is preferably less than a wavelength of the laser light therein to permit substantial transfer of wave energy to the film without requiring undue length for the coupling region when the gap is air. If the gap is filled with an index-matching liquid, wider gaps become practical. In particular, for the most efficient coupling it is important that the gap width $W$ be chosen such that $$W/\lambda_0\sqrt{n_4^2-n_1^2} < 1$$

where $\lambda_0$ is the wavelength in free space of the light from laser 11, and $n_1$ and $n_4$ are the refractive indices of the gap material and the substrate, respectively. Moreover the gap width should be wide enough to avoid substantial contact between surface 18 and the film 12 inasmuch as such contact tends to transfer some light from the film back to the prism and so to reduce the efficiency of the transfer. Since it is usually difficult to achieve in a commercially practical manner surface smoothness for the film or prism better than one-tenth of the wavelengths involved for any extended distance, the gap width advantageously should be at least this. For free space or air, a gap of about one-half a wavelength is generally a good compromise between the various considerations mentioned. Usually the spacing is best achieved by pressing with adjustable pressure the film against the prism surface 18 whereby residual dust particles, serving as spacers, and the elasticity of the substrate permit adjustment of the gap by variation of the pressure. Ordinarily in a laboratory, the adjustment is best made experimentally.

The coherent light from laser 11 advantageously is first collimated into a beam by lens 19 before being applied to the prism 16. After refraction in prism 16, the light beam is incident upon surface 18 of the prism at an angle $\theta$. The angle $\theta$ as described more fully in my earlier application, is selected so that phase matching of the evanescent wave and the wave propagating in the film is realized. As described therein, this angle is related to the indices of refraction of the materials involved and it determines the orientation of the common optical axis of laser 11 and lens 19. The region of distributed action of the evanescent field of the light wave extends throughout the area of surface 18 which is illuminated by the beam. This typically is between 1 and 2 millimeters. As the wave induced in the film 12 propagates to the right beyond the region where the beam is incident thereon, its own evanescent field would tend to feed energy back into prism 16 if the prism were not decoupled from the film. As one of several possible remedies for this, prism 16 is cut so that it is decoupled from the film beyond the region where the light beam is incident on the film. The light wave induced in film 12 propagates to the right, undergoing multiple reflections inside the film. The multiple interval reflections within the film determines the propagation velocity of the wave in the film according to principles analogous to those applicable to microwave waveguides.

While a portion of the light from laser 11 can be coupled into film 12 in this way, another portion suffers internal reflection at surface 18 of prism 16 and exits out another surface. This radiation can be used for monitoring the coupling process.

As described in my earlier application, there is possible a plurality of propagating modes for a given film, the number growing with the number of wavelengths in the film thickness. Each of these modes has its own characteristic phase propagation constant $\beta_2$. The choice of the angle $\theta$ provides a means for exciting selected propagating modes in the film. In particular, if $\beta$ is the propagation constant of the mode under consideration, then the appropriate direction should substantially satisfy the relationship $$\beta = \omega/c\, n \cos\theta$$

where $\omega$ and $c$ are respectively the angular frequency and the velocity of light in vacuum and $n$ is the index of refraction of the prism.

In the present invention, the choice of the angle $\theta$ is used to establish in the film the propagating modes that satisfy the necessary phase-matching conditions.

The launched beam continues along the waveguide 12 and undergoes the interaction along region 20, which typically may be 1 or 2 centimeters long, corresponding to thousands of wavelengths. At the end of the interaction region, the desired interaction product or stimulated wave is abstracted advantageously by an internal reflection prism 22 coupled to the waveguide in the same manner as prism 16. The desired abstracted beam is supplied to a suitable utilization means 23 which can take a wide variety of forms. Normally there will also be coupled out wave energy at other wavelengths. However, such energy will be refracted different amounts by prism 22 and so can easily be kept separate from that desired since they exit along different directions.

It will be convenient now to discuss as a specific example by way of illustration an arrangement for generating the second harmonic from a fundamental of 1.06 microns such as is provided by a neodymium-doped yttrium aluminum garnet laser. A polycrystalline zinc sulfide film is deposited, typically by evaporation, on a single crystal of zinc oxide whose c-axis is normal to the surface parallel to the film. By virtue of the fact that there is being utilized interaction in the substrate rather than the film, it is adequate that only the substrate be monocrystalline. At the fundamental (1.06 microns), the refractive indices of the materials are listed below:

| | |
|---|---|
| ZnO | $n=1.9411$ (ordinary). |
| | $n=1.9562$ (extraordinary). |
| ZnS | $n=2.2899$ (ordinary and extraordinary). |
| Air Gap | $n=1.0000$ (ordinary and extraordinary). |
| Rutile prism | $n=2.4810$ (ordinary). |
| | $n=2.7359$ (extraordinary). |

At the second harmonic 0.53 micron, they are:

| | |
|---|---|
| ZnO | $n=2.0353$ (ordinary). |
| | $n=2.0521$ (extraordinary). |
| ZnS | $n=2.4038$ (ordinary and extraordinary). |
| Air gap | $n=1.0000$ (ordinary and extraordinary). |
| Rutile prism | $n=2.6686$ (ordinary). |
| | $n=2.9663$ (extraordinary). |

As is well known in crystal physics, whenever the ordinary and extraordinary refractive indices are different, ordinary rays see a refractive index equal to $n$ (ordinary) whereas the refractive index seen by the extraordinary rays depends upon their directions of propagation. For example, an extraordinary ray propagating in a direction $\Phi°$ from the optic axis has a refractive index $n$ computed as follows $$\frac{1}{n^2} = \frac{\sin^2\varphi}{[n(\text{extraordinary})]^2} + \frac{\cos^2\varphi}{[n(\text{ordinary})]^2}$$

By analysis, it is found that with TM waves in the film, corresponding to extraordinary rays for both the fundamental and second harmonic, for a film thickness of 1.098 microns, the fundamental has an operating mode of first order, whose propagation constant $\beta_F$ is twice the propagation constant of the second harmonic $\beta_h$ with an operating mode of fourth order whereby there are satisfied the phase-matching conditions since $$\beta_F\, f_{(\text{fundamental})} = \beta_h\, f_{(\text{2nd harmonic})}.$$

In this case, the fundamental should have an angle $\theta$ approximately equal to $\theta=36.32°$ and the fundamental and the second harmonic emerge from the output prism approximately at the angles $\theta=36.32°$ and $\theta=41.22°$ respectively, where $\theta$ is the angle between the direction of propagation of the light beam and the surface of the film as shown in the drawing. I have used here the nonlinear coefficient $d_{33}$ of ZnO, which happens to be the largest nonlinear coefficient of ZnO. The electric field-components which participate in the nonlinear interaction are normal to the film surface, for both the fundamental and the second harmonic. As another example, the conditions are satisfied for a film thickness of 0.781 microns for the fundamental of zeroth order and the second harmonic of second order. The corresponding angles for the fundamental and second harmonic are respectively $\theta=33.33°$ and $\theta=38.72°$. There are many other possible conditions by properly combining the fundamental and the second harmonic of different orders. The angles described above are computed for a rutile prism which has a prism angle $\alpha=40°$ and its optic axis normal to the surface of the film as shown.

These thicknesses of the films have been found in accordance with the following analysis. The thickness $W$ is chosen so that the following relationship is satisfied $$2b_2 W - 2\psi_{21} - 2a_{H_{24}} = 2m\pi \qquad (1)$$

where the integer $m$ is the order of the mode, the subscripts 1, 2, 3 and 4 refer to the gap, film, prism and substrate, respectively, and for TM waves, $$\tan \Psi_{21} = \left(\frac{n_2}{n_1}\right)^2 \frac{p_1}{b_2} \qquad (2)$$

$$\tan \Psi_{24} = \left(\frac{n_2}{n_4}\right)^2 \frac{p_4}{b_2} \qquad (3)$$

where $\psi_{21}$ and $\psi_{24}$ are the smallest positive values satisfying the above relations, and $$b_2 = \sqrt{(kn_2)^2 - \beta^2} \qquad (4)$$
$$p_1 = \sqrt{\beta^2 - (kn_1)^2} \qquad (5)$$
$$p_4 = \sqrt{\beta^2 - (kn_4)^2} \qquad (6)$$

and $k = \omega/C = 2\pi/\lambda_0$ where $k$ is the free space wavelength, and $\beta$ is the propagation constant.

From Equation (6) it is seen that $p_4$ is positive and real, as required, only when $\beta > kn_4$.

From Equation (4) it is seen that $b_2$ is positive and real only when $\beta < kn_2$.

The actual solving of these equations to derive values of thickness $W$ which result in the desired matching between the propagation constant $\beta$ for different order modes of the fundamental and second harmonic waves is best done by an electronic computer.

For the case of TE waves $$\tan \psi_{21} = p_1/b_2$$
$$\tan \psi_{24} = p_4/b_2$$

Let us consider the case that the optical axis of ZnO is normal to the plane of the paper (see FIG. 2). In this case I again use the $d_{33}$ nonlinear coefficient of ZnO, but now the electric fields which participate in the nonlinear interaction are in the direction normal to the plane of the paper, and the fundamental and the harmonic rays involved are again the extraordinary rays. Assuming use of the same rutile prism, the analysis shows, for example, that the phase-matching conditions are satisfied when the fundamental is of the zeroth order mode and the harmonic is of the first order mode for a film thickness of 0.413 micron. The corresponding angles $\theta$ for the fundamental and the second harmonic are respectively about 32.86° and $\theta=38.65°$.

It is also feasible to extend the principles described to parametric amplification and oscillation which also involve nonlinear interaction processes. For example, parametric oscillation and amplification in the degenerate case where there is derived for utilization an output wave whose wavelength is twice that of the pumping energy, can be achieved by appropriate reversal of the conditions for second harmonic operation. Specifically, for the example described, if there be supplied as an input or pump, wave energy at 0.53 micron to propagate as a first order TE wave in the film there will be generated energy at 1.06 microns propagating as a zero-order TE wave which can be abstracted for utilization. The wavelength of this output can best be varied or tuned by varying the angle at which the pump wave is introduced into the film. If amplification be desired, there can similarly be applied to the film an input wave of 1.06 microns.

In the drawing there is shown how the arrangement previously described can be modified for use as an amplifier. To this end, provision is made for introducing into the waveguide an input signal to be amplified in addition to the pump energy. This can conveniently be done by utilizing the prism 16 to launch simultaneously both signal energy from laser source 11 and pump energy from different laser source 25 into the film waveguide 12. This is facilitated by the fact that the signal energy being of a different wavelength and to be set up in a different order mode requires for efficient coupling a different angle of incidence.

Similarly for frequency shifting or nondegenerate parametric oscillation there will be supplied into the waveguide film defining the region of interaction a pair of optical waves.

It can be appreciated that the specific embodiments described are merely illustrative of the general principles of the invention. Other materials may be used to form the film waveguide and light of other wavelength can be used with appropriate changes, particularly in the angle of incidence of the light beam on the film waveguide over the coupling region and the thickness of the film.

Moreover with some materials, the nonlinear nature of the material can be enhanced by the application of biasing electric or magnetic fields, with a consequent increase in the efficiency of the desired nonlinear interaction process.

What I claim is:

1. In combination, means forming an optical waveguide comprising a thin film overlying a substrate of different refractive index, the thickness of the film and the indices of refraction of the film and substrate being such as to provide phase-matching conditions in the substrate between the evanescent fields of an input pump wave and a stimulated wave of different wavelength propagating in different order modes in the film, means at one end of the waveguide to launch an input wave in the film to propagate in a desired mode order, and means at the other end of the waveguide for abstracting for utilization the stimulated wave.

2. The combination of claim 1 in which the launching means comprise an internal reflection prism coupled to the waveguide.

3. The combination of claim 2 in which the abstracting means comprises a second internal reflection prism spaced apart along the waveguide from the first-mentioned internal reflection prism.

4. The combination of claim 1 in combination with a laser providing a coherent light beam which is supplied to the prism at an angle for internal reflection therein at the surface coupled to the waveguide, the angle of incidence of the beam with said surface being adjusted for exciting in the waveguide a light wave of desired propagating mode order.

UNITED STATES PATENT OFFICE
CERTIFICATE OF CORRECTION

Patent No. 3,586,872       Dated June 22, 1971

Inventor(s) Ping K. Tien

It is certified that error appears in the above-identified patent and that said Letters Patent are hereby corrected as shown below:

Column 2, line 32, in the equation, line should not extend over <1 and a space should be shown between $n_1^2$ and <1, as follows:

$$W/\lambda_o \sqrt{n_4^2 - n_1^2} < 1$$

Column 4, line 33, Equation (1) should read as follows:

$$2b_2 W - 2\psi_{21} - 2\psi_{24} = 2m\pi \quad (1)$$

Signed and sealed this 23rd day of May 1972.

(SEAL)
Attest:

EDWARD M. FLETCHER, JR.
Attesting Officer

ROBERT GOTTSCHALK
Commissioner of Patents